United States Patent

[11] 3,590,659

[72] Inventor Arthur M. Maroth
 46 Grumman Hill Road,
 Wilton, Conn.
[21] Appl. No. 888,756
[22] Filed Dec. 29, 1969
[45] Patented July 6, 1971

[54] NUTATING SPEED CHANGING MECHANICAL TRANSMISSION
19 Claims, 3 Drawing Figs.

[52] U.S. Cl. .................................................. 74/800
[51] Int. Cl. .................................................. F16h 1/28
[50] Field of Search .......................................... 74/800, 60; 310/82

[56] References Cited
UNITED STATES PATENTS
3,428,839 12/1970 Singleton et al. ............. 74/800 X Primary Examiner—Leonard H. Gerin
Attorney—Louis H. Reens ABSTRACT: A speed changer apparatus wherein a nutating member having force transfer members in the form of roller elements nutatively contacts inclined surfaces on an action member coupled to an output shaft. The nutating member is prevented from rotation by stationary mounted inclined surfaces which are contacted by force transfer members. The nutating member is peripherally engaged by a rotating driving member coupled to a rotating input shaft. The driving member is provided with a surface shaped to impart nutative motion to the nutating member. Excellent axial balance is obtained by operating a pair of nutating sections with opposing axial motions with respect to each other.

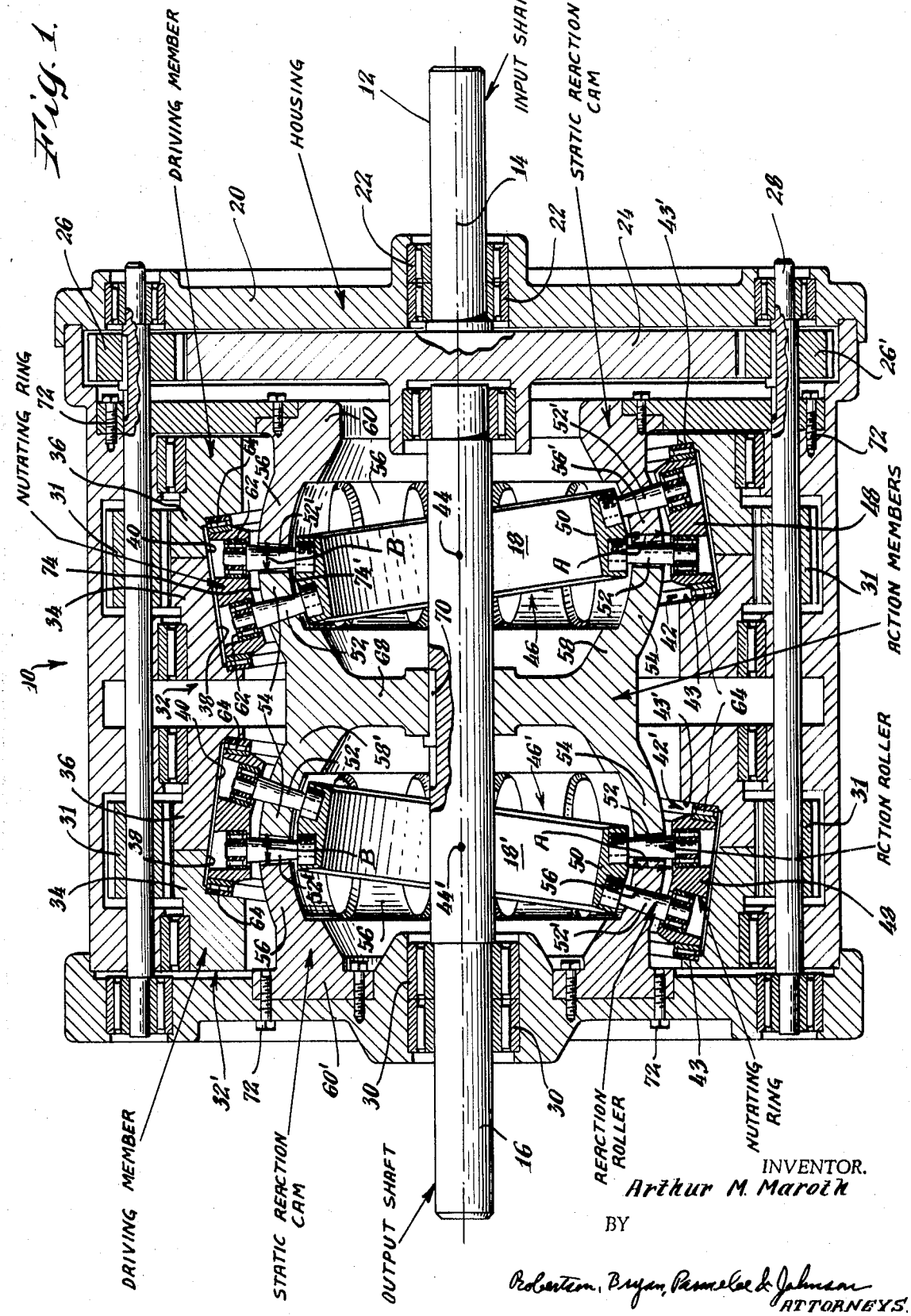

INVENTOR.
Arthur M. Maroth

NUTATING SPEED CHANGING MECHANICAL TRANSMISSION

This invention relates to a mechanical speed changer. More specifically this invention relates to a transmission for converting the rotational speed of an input member to a different speed of an output member substantially without slip.

In a speed changer apparatus in accordance with the invention a nutating member is brought into nutation about a fulcrum by a driving member. The nutating member nutatively contacts an action member coupled to the output to impart rotation thereto with high torque driving capability utilizing rolling contact.

In an illustrative embodiment of the invention a nutation section is formed wherein the nutating member is provided with force transfer members. The force transfer members are in the form of roller elements which nutatively contact inclined surfaces located on the action member and a stationary reaction member. The reaction member inclined surfaces are arranged and shaped to prevent rotation of the nutating member as it is brought into nutation by the driving member.

Excellent axial balance is obtained by operating a pair of nutating sections with opposing axial motions with respect to each other.

Nutation of a wobble plate has been previously disclosed in my U.S. Pat. Nos. 3,139,772 and 3,094,880. As described in my U.S. Pat. No. 3,139,772, nutation of the wobble plate is obtained with a drive shaft connected centrally of the wobble plate. During nutation of the wobble plate, wedges located thereon act against sockets in an action member for rotation thereof.

Transmissions utilizing gears involve considerable sliding contact (slip) between torque transferring teeth. The transmission of this invention is characterized in that speed changes of an input shaft are obtained substantially without slip. During transfer of power in a transmission of this invention rolling instead of sliding contact is utilized.

Since a transmission of this invention may have at any one instant several force transfer members in operative contact with inclined surfaces large torques may be converted. As a result a transmission of this invention is capable of converting large torques in comparison with a comparably sized conventional gear transmission.

In the manufacture of a transmission in accordance with the invention excellent manufacturing precision of its torque bearing components may be obtained with highly accurate repeatability.

It is therefore an object of this invention to provide a transmission substantially without slip.

It is a further object of the invention to provide a transmission of high power handling capability with great efficiency.

These an other advantages and objects of the invention may be understood from the following description of a transmission in accordance with the invention in conjunction with the drawing wherein:

FIG. 1 is an axial section view of a speed reducer transmission in accordance with the invention;

Figure 2A:
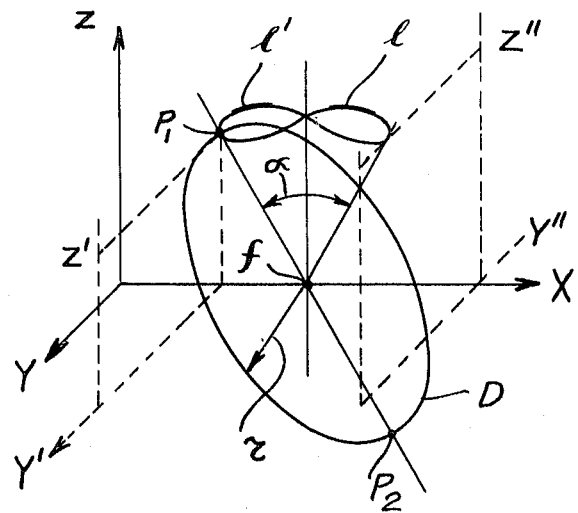
FIG. 2A is a perspective schematic illustration of nutative movement as used in a transmission illustrated in FIG. 1.

In a copending patent application of mine entitled MECHANICALLY INTERLOCKED INFINITELY VARIABLE TRANSMISSION, Ser. No. 813,019 filed on Apr. 3, 1969, I describe a variable speed transmission utilizing nutation motion to obtain a desired speed of an output shaft. Several of the component elements found in the following description are also described in this copending case. Reference to this application may be had for further description of these common elements.

With reference to the drawing I show a speed reducer transmission 10. The transmission has an input shaft 12 rotating about an axis 14. A speed reduction of preselected value as will be explained is obtained from an output shaft 16 located coaxially with axis 14.

Transmission 10 is formed of two nutation sections 18–18' of like structure but operated in opposite axial directions to balance out axial inertia forces generated by each individual nutation section 18–18'. It should be understood, however, that a transmission in accordance with the invention may utilize a single nutation section.

A description of nutating motion may be found in my patents as well as the above-identified copending application. Briefly, nutating motion may be explained with reference to the FIGS. 2A and 2B.

In FIG. 2A, I show an X, Y, Z rectangular coordinate system. A nutating member in the form of a disc D of radius $r$ is positioned with its center $f$, located on the X-axis corresponding to the axis of rotation 14. Disc D is shown in maximum inclined position relative to the X-axis whereby its perimeter point $P_1$, located at the intersection of the disc with the X–Z plane, may be considered within a Y'–Z' plane. This latter plane is parallel to the Y–Z plane. The Y'–Z' plane is the plane into which all the perimeter points P of the disc are brought as disc D is wobbled with respect to its center $f$. Center $f$ thus becomes a fulcrum. Accordingly, there is also a plane, Y''–Z'', into which all points $P_2$ are brought, where $P_2$ is located at an angular location of 180° from $P_1$. Planes Y'–Z' and Y''–Z'' define the nutation angle $\alpha$, i.e., the maximum angular swing of $P_1$ relative to $f$ when projected in the plane X–Z.

As disc D is nutated about fulcrum $f$ and all perimeter points P are sequentially brought into the Y'–Z' and Y''–Z'' planes each perimeter point P follows a contour which resembles a lemniscate 1. This contour is located on a spherical surface because disc D is rigid and any movement of P occurs at a constant distance from and about the fulcrum $f$. The contour should be construed to include motions along all axes X, Y and Z, though for preferably small angles of L the motion of $P_1$ along the Z-axis is very small.

The motion of perimeter point $P_1$ as projected on the X–Y plane takes the form of a lemniscate 1, a FIG. 8 like shape. If point $P_1$ during its motion along path 1' in the direction indicated encounters a rotationally mounted inclined surface S, the latter surface will be rotated clockwise out of the path of point $P_1$. The degree of rotation of inclined surface S depends upon its orientation and the shape of the lemniscate. In the projection view of FIG. 2B the angle $\theta$ that surface S makes with the X-axis determines the imparted rotation of surface S.

In the view of FIG. 2A, one may appreciate that a plurality of surfaces will be angularly distributed about the axis of rotation, X, to be sequentially engaged by different points on the disc D as the latter is nutated. Continuous rotation of these surfaces may then be obtained. One may further appreciate that depending upon the surface shape either a point or line contact with disc D is obtained. Furthermore, surface S, as explained in the above-identified application, may be curved rather than straight as suggested in FIG. 2B.

In a transmission in accordance with the invention a nutating member such as disc D is rotationally mounted with respect to a driving member. The driving member is then so shaped as to impart nutative movement to the disc upon rotation of the driving member. Since the nutating member would tend to rotate as it is brought against and inclined surface, the nutating member is restrained by providing contact of another of its perimeter area with a stationary reaction member. This reaction member is provided with inclined surfaces such as S and which are contacted by said other perimeter area as it passes through a portion of its lemniscate like path as represented by the portion 1'' of the lemniscate curve in FIG. 2B.

With reference to FIG. 1 the input shaft 12 is rotatably mounted to a housing 20 by means of suitable antifriction elements 22 and is directly coupled via a gear 24 to input pinions 26–26' mounted on rotor shafts 28–28'. Rotor shafts 28–28' couple the input power applied to input shaft 12 to the two axially adjacent nutating sections 18–18' which are coaxially located with respect to output shaft 16. Output shaft 16 is rotationally mounted to housing 20 with antifriction elements 30.

Rotor shafts 28—28' are coupled by pinions such as 31 to annular rotors 32—32' coaxially located around axis 14. Rotors 32—32' are each formed of two axially joined annular components 34—36 which are held to one another by suitable bolts (not shown) around the rotors' radially outer periphery. The radially outer periphery of each rotor 32—32' is provided with gear teeth for engagement with pinions 31.

The drive for nutation sections 18—18' is thus shown provided by input shaft 12 through gears and pinions such as 24, 26—26', and 31. Alternatively, a direct connection without gears and pinions may be made between input shaft 12 and rotors 32—32'. Specifically, one may directly engage input shaft 12 to a cylinder fastened to rotors 32—32'.

The axial components 34—36 of rotors 32—32' are respectively provided with counterbores 38—40 which, upon joining of components 34—36, define annular radially inwardly facing grooves 42—42', one in each rotor. Each groove 42 is oriented at an angle $\alpha/2$ with respect to a plane normal to axis 14. The annular grooves 42 are of general rectangular configuration and as shown in FIG. 1 are slanted and symmetrically located with respect to fulcrums 44—44'. The annular grooves include each a pair of sidewalls 43—43' which engage the axially opposite sides of nutating members such as 46—46'. Fulcrums 44—44 are located on axis of rotation 14 and respectively are the fulcrums for nutation sections 18—18'.

Within each of grooves 42—42' are the nutating members 46 and 46' respectively. Each of nutating members 46—46' is composed of an outer nutating ring 48 and an inner nutating ring 50. Rings 48—50 are mounted in coplanar fashion and are connected to one another by a plurality of force transfer members 52—52' and fixed spacers (not shown). Rings 48—50 are sized to provide a radial clearance A between them to receive inclined surfaces 54—56 mounted on an action member 58 and reaction member 60 respectively. Reaction members 60—60' are stationary mounted to the transmission housing 20.

The force transfer members are in the form of conical rollers and are uniformly angularly distributed in the radial clearance A between rings 48—50. Two sets of rollers are employed. A first set of rollers such as 52 is used and located to contact only inclined surfaces 54 on action members 58—58' and the rollers in this set are, therefore, called action rollers. The other set of rollers such as 52' are used and located to contact only inclined surfaces 56 on reaction members 60—6040 and are, therefore, called reaction rollers.

Although a single set of rollers could be employed, two sets as shown are preferred because this assures rotation of the rollers in the same direction at all times. A single set of rollers would encounter a reversal in rotation as it moved from action to reaction member and vice versa. Since the transmission may operate at very high speeds one may appreciate that sudden reversal of roller rotation would result in sliding contact of the rollers. A double set of roller maintains the desirable rolling contact without slip at elevated operating speeds.

Each roller element 52—52' is conically shaped and has a axis of rotation (called fulcrum axis) which passes through a fulcrum such as 44—44'. The apex of the cones of each roller is further designed to coincide with a fulcrum such as 44 or 44'. Each roller element is mounted with antifriction elements 62 to the inner and outer nutating rings 48—50 so that the force transfer members may roll over inclined surfaces 58—60.

Outer ring 48 is further flanked on both sides within annular grooves 42—42' by antifriction elements 64. Antifriction elements 64 are mounted on both axial sides of ring 48 to contact sidewalls 43—43' of grooves 42—42' in antifrictional relationship.

The number of pairs of rollers, 52—52', employed in nutating members 46—46' is determinative of the speed reduction that is desired. In the description of the operation of the transmission further reference will be made to this aspect in conjunction with the number of inclined surfaces located on the action and reaction members.

Action members 58—58' are connected to one another at a common wall 68 which is affixed to output shaft 16 with a key 70. Reaction members 60—60' are stationary and mounted to the housing 20 with suitable bolts such as 72.

Action members 58—58' and reaction members 60—60' are coaxially mounted with input shaft 12 and output shaft 16. Each action and reaction member is provided with a plurality of fixed inclined surfaces such as 54 and 56 respectively. These inclined surfaces of both action and reaction members are surface sections curved partially along a lemniscate (as traced out by a nutating roller element 52) and are further cut along circle sectors 74—74' having centers at the fulcrums.

The angular width (out of the plane of the drawing) of the inclined surfaces is chosen to impart substantial load bearing strength thereto, yet this width is not so great as to interfere with the nutating motion of roller elements 52—52'. As seen in FIG. 1, the inclined surfaces 54 arch in cantilever fashion towards similarly arching surfaces from the reaction member 60. The inclined surfaces extend towards each other but terminate with sufficient clearance B to freely receive a roller element. As shown in nutation section 18 a reaction roller 52' is located above fulcrum 44 in the clearance B and an action roller 52 is located in the clearance B below fulcrum 44.

The inclined surfaces referred to herein are surface sections, which if assumed planar, are located in a fulcrum plane passing through the fulcrum. The fulcrum plane forms an angle with an axial plane defined as the plane passing through axis 14 and the cantilever end of an inclined surface adjacent clearance B.

The angle between these planes determines the amount of output shaft rotation when an action roller is nutated. For a fixed ratio transmission speed reducer the angle is chosen so that after a complete nutation of nutating member 46 (i.e., after all action rollers 52 have completed one nutation) the next inclined surface is located opposite the action roller first brought into nutation.

The inclined surfaces on the action and reaction members may be formed of surfaces of revolution of a lemniscate curve portion so that the transmission may accommodate both a clockwise and counterclockwise rotating input shaft. For a desired clockwise rotation of output shaft 16, the operative action member inclined surfaces 54 are slanted in a generally counterclockwise direction (as viewed from their cantilever ends) and the operative inclined surfaces 56 on the reaction member are slanted in a counterclockwise direction as viewed from their cantilever ends. Furthermore, as each action roller 52 engages an action member inclined surface 54 there is a reaction roller 52' in engagement with a reaction member inclined surface 56 at such angular location as to prevent rotation of nutating member 46.

The speed reducer of FIG. 1 employs a selected number of inclined surfaces on each action and reaction member as well as a selected number of force transfer members. In the apparatus disclosed in my U.S. Pat. No. 3,139,772 the inclined surfaces are mounted as a selected number of wedges on a nutating member. These wedges act against sockets in an action member. For a fixed speed reducing device as described in the patent the nutating member has 16 wedges and the action member, or driven wheel, has 15 sockets. One complete nutation of the nutating member or driving wobble plate effects a one-fifteenth of a revolution of the output shaft or action member.

In the nutation sections 18—18' each of the action members 58—58' may be provided with as many inclined surfaces 54 as can be accommodated. For an illustrative embodiment a total of nine action inclined surfaces 54 are used. In such case, eight rollers 52, and eight rollers 52' are used to yield a speed reduction of one to nine.

The reaction members 60—60', however, are each provided with as many inclined surfaces 56 as there are reaction rollers 52'. The reason for this resides in the function of the reaction member inclined surfaces 56. These latter inclined surfaces serve to prevent rotation of the nutating member. This function may be further appreciated in view of the following illustrative operation.

Assume a prime mover such as a motor (not shown) rotates input shaft 12 in a counterclockwise direction. This causes rotor shafts 28-28' to rotate in clockwise directions and rotors 32 counterclockwise.

Rotation of rotors 32 produces a corresponding rotation of the inclined annular grooves 42-42' which thus bring angularly sequentially located action rollers 52 into engagement with action rollers inclined surfaces 54. At the same time, another portion of grooves 42-42' brings reaction rollers 52' into operative engagement with inclined surfaces 56 at such angular locations as to prevent both clockwise and counterclockwise rotation of nutating members 46-46'. Other action and reaction rollers are in transit towards or away from inclined surfaces and follow a contour 1 as depicted in FIGS. 2A and 2B.

Figure 2B:
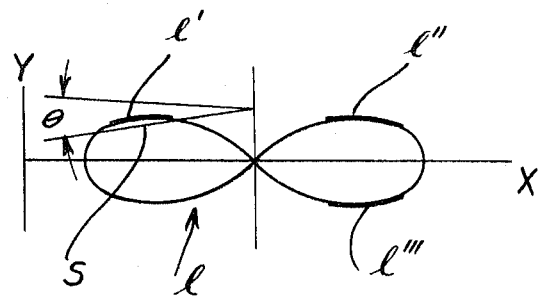
FIG. 2B is a planar diagrammatic projection of nutative motion of a perimeter point on a nutating member.

The simultaneous engagement of an action roller 52 and reaction rollers 52 is graphically illustrated in FIG. 2B with the projection of the motion of a roller in the Y-X plane. As shown in this projection an action roller 52 engages an inclined surface 54 for a span indicated by the emphasized curve length 1'. Simultaneously, reaction rollers 52', engage inclined surfaces 56 to prevent rotation of nutating members 46-46' for a corresponding span indicated by the curves 1''. Curve spans 1' and 1'' are equal in length and time duration.

Hence, as a rotor 32 rotates and brings an action and reaction roller in engagement with inclined surfaces it causes a rotation of action members 58-58' and thus output shaft 16. This rotation is an increment determined by the contact of an action roller with an inclined surface 54. This contact duration as well as the rotation it produces are a function of the angle formed between inclined surfaces and axial planes as well as the nutation angle $\alpha$.

There parameters, i.e., the angle of the inclined surfaces and the nutation angle are selected so that a complete nutation of nutating members 46-46' produces an angular movement of the action members equal to the angular spacing between adjacent inclined surfaces. Hence, the completion of one nutation, or one full rotation of rotors 32, rotationally advances output shaft at one-ninth (for nine inclined surfaces) times the rotational speed of rotors 32.

When one considers the above-described operation for a single nutation section such as 18, one may appreciate that at a very high operating speeds substantial axial inertia forces may be generated. These axial forces are the result of the high-speed nutation of the nutating member. The employment of a pair of nutating sections, which operate effectively in axially opposite directions, substantially cancels these axial forces to yield a smoothly operating transmission.

Smoothly balanced operation is further enhanced by the annular construction of nutating members 46-46'. The removal of the central portions of inner nutation rings 50 reduces the mass of the nutation members. The radial peripheral nutating drive provided by rotors 32 permits large torque conversions.

As nutation proceeds, continuous contact between the nutating members 46-46' and the load (as presented by action members 58-58') is preserved. This continuous contact is distributed over several force transfer members at any instant of time depending upon the number used. The contacting rollers are located in a common quadrant which rotates as nutation proceeds.

The distribution of the load over several force transfer members, the peripheral drive of the nutating member as well as many of the other advantages of the transmission described herein, cooperate to produce a powerful highly efficient transmission.

I claim:

1. A transmission for converting the rotational input speed of an input member to a different speed of an output member comprising:
    a housing,
    an action member rotatably mounted to the housing for rotation about an axis and operatively engaged with the output member to impart rotation thereto,
    a nutating member operatively located opposite the action member for nutation about a fulcrum,
    means producing inclined surfaces and force transfer members interposed between the action and nutating members to impart rotation of the output member upon nutation of the nutating member,
    a rotor rotatably mounted to the housing annularly and nutatively engaging the nutating member in annular relationship with the fulcrum, said rotor being provided with a generally radially inwardly extending surface shaped to impart nutation of the nutating member upon rotor rotation about the fulcrum, said rotor further being coupled to the input member for being driven into rotation therewith.

2. The transmission as claimed in claim 1 wherein the rotor radially inwardly extending surface is in the shape of an annular radially inwardly facing groove, said groove being inclined at a desired nutation angle with respect to the axis of rotation of the action member and with said nutating member operatively engaging sidewalls of the groove.

3. The transmission as claimed in claim 2 and further including antifriction elements located between the nutating member and sidewalls of the groove.

4. A transmission for converting the rotational speed of an input member to a different speed of an output member comprising:
    a housing,
    an action member mounted for rotation to the housing about an axis and coupled to the output member to impart rotation thereto,
    a nutating member operatively located opposite the action member for nutation about a fulcrum,
    said action member, nutating member and housing being provided with action inclined surfaces, reaction inclined surfaces and force transfer members distributed about the fulcrum and said rotational axis with action inclined surfaces and force transfer members interposed between the action and the nutating member about said axis to impart rotation of the action member upon nutation of the nutating member and with the reaction inclined surfaces and force transfer members operatively located between the nutating member and the housing to prevent rotation of the nutating member,
    means driven by the input member for driving said nutating member into nutation and provide rotation of the output member in correspondence with nutative contact between force transfer members and action and reaction inclined surfaces.

5. The transmission as claimed in claim 4 wherein said driving means includes:
    a rotor rotatably mounted to the housing and annularly engaging said nutating member, said rotor being provided with a radially inwardly extending surface shaped to impart nutation to the nutating member upon rotor rotation.

6. The transmission as claimed in claim 4 wherein said nutating member is provided with angularly distributed force transfer members and with the action member and housing respectively provided with action and reaction inclined surfaces.

7. The transmission as claimed in claim 6 wherein the force transfer members include action rollers arranged to contact only action inclined surfaces and reaction rollers arranged to contact only reaction inclined surfaces.

8. The transmission as claimed in claim 7 wherein the action and reaction inclined surfaces are each in the form of a surface of revolution of a curve conforming to a portion of a lemniscate traced by a nutating roller.

9. The transmission as claimed in claim 8 wherein the action and reaction rollers are mounted for rotation about an axis passing through the fulcrum.

10. A transmission for converting the rotational speed of an input member to a different speed of an output member comprising:
- a first nutation section including a first nutating member and a first rotatably mounted action member coupled to the output member with the first nutating member arranged to nutate about a fulcrum located on the axis of rotation of the first action member and arranged to nutatively contact the action member to impart rotation thereto,
- a second nutation section including a second nutating member and a second action member coupled to the output member, said second action member being mounted for rotation about said first action member rotational axis, with the second nutating member arranged to nutate about a fulcrum located on said axis of rotation and arranged to nutatively contact the action member to impart rotation thereto,
- means driven by the input member for imparting nutational movement to said first and second nutation member with said first and second nutation members being selectively operatively angularly disposed with respect to one another about said axis to operate in axially opposing directions for substantial balance of axial components of inertia forces.

11. The transmission as claimed in claim 10 wherein said means for imparting nutational movement includes:
- a first annular rotationally mounted rotor peripherally engaging the first nutating member and provided with a radially inwardly facing surface shaped to impart nutation to the nutating member upon rotation of the rotor,
- a second annular rotationally mounted rotor peripherally engaging the second nutating member and provided with a radially inwardly facing surface shaped to impart nutation to the nutating member upon rotation of said second rotor,
- with both of said rotor surfaces located in planes which are selectively inclined with respect to the axis of rotation at an angle selected to form a desired nutation angle and with said first and second rotor surfaces angularly disposed about said axis relative to each other to provide an axially balanced transmission upon rotation of the rotors by the input member.

12. The transmission as claimed in claim 11 wherein both rotor surfaces are each in the form of a pair of radially inwardly extending walls engaging a nutating member in axially opposing directions to drive said nutating members into full nutation motion.

13. The transmission as claimed in claim 12 wherein the rotors are each provided with a radially inwardly facing annular groove having generally radially inwardly facing sidewalls sized to engage axial sides of a nutating member.

14. The transmission as claimed in claim 10 wherein said means for imparting nutational movement includes:
- first rotating means driven by the input member producing a first pair of first nutating member engaging surfaces arranged to impart respective axially opposing nutating motions to the first nutating member upon rotation of said surfaces, and
- second rotating means driven by the input member producing a second pair of second nutating member engaging surfaces arranged to impart respectively axially opposing nutating motions to the second nutating member upon rotation of said surfaces, with said first and second pair of nutating member engaging surfaces shaped to impart nutation to the nutating member upon rotation and with said first and second pair of surfaces selectively angularly disposed with respect to one another for balanced operation of the transmission upon rotation of these surfaces by the input member.

15. The transmission as claimed in claim 14 wherein said first and second pair of surfaces are annular.

16. The transmission as claimed in claim 15 wherein said first and second pair of surfaces face generally radially inwardly towards the axis of rotation.

17. A nutating member for use in a transmission to convert the rotational input speed of an input member to a different speed of an output member comprising:
- a rigid frame member adapted for nutation about a fulcrum,
- a first set of uniformly angularly distributed force transfer members in the form of roller elements mounted for rotation about axes passing through the fulcrum and disposed to operate on one side of the frame member upon nutation thereof in said one side direction, and
- a second set of uniformly angularly distributed force transfer members in the form of roller elements mounted for rotation about axes passing through the fulcrum and disposed to operate on another side of the frame member opposite to said one side during nutation in said other side direction.

18. The nutating member as claimed in claim 17 wherein said rigid frame member is in the shape of a pair of coplanar mounted interconnected rings, said rings being of selected radial dimensions to form a radial clearance with said roller elements located between the rings in said radial clearance.

19. A nutating member for use in a transmission to convert the rotational input speed of an input member to a different speed of an output member comprising:
- a radially inner nutating ring and a radially outer nutating ring, said inner and outer rings being mounted in coplanar relationship with one another for nutation about a fulcrum, force transfer members located between the inner and outer rings, said force transfer members being angularly uniformly distributed and in the form of roller elements mounted for rotation about axes passing through the fulcrum.